United States Patent [19]

Csongor et al.

[11] Patent Number: 5,025,485

[45] Date of Patent: Jun. 18, 1991

[54] MULTI-FEED, MULTI-CHANNEL COMMUNICATION SYSTEM

[75] Inventors: Rezso J. Csongor, King of Prussia, Pa.; Leroy J. Tangradi, Bellmawr, N.J.

[73] Assignee: General Electric Company, East Windsor, N.J.

[21] Appl. No.: 296,456

[22] Filed: Jan. 12, 1989

[51] Int. Cl.$^5$ .............................................. H04B 7/19
[52] U.S. Cl. .................................... 455/12; 455/103; 455/273; 342/356; 342/368
[58] Field of Search ................. 455/12, 102, 103, 137, 455/273; 375/1; 342/373, 368, 356, 352

[56] References Cited

U.S. PATENT DOCUMENTS

| | | |
|---|---|---|
| 4,232,321 | 11/1980 | Ohm . |
| 4,639,932 | 1/1987 | Schiff . |
| 4,745,599 | 5/1988 | Raychaudhuri . |
| 4,774,707 | 9/1988 | Raychaudhuri . |
| 4,868,886 | 9/1989 | Assal et al. .............................. 455/12 |
| 4,901,085 | 2/1990 | Spring et al. .......................... 455/12 |
| 4,901,368 | 2/1990 | Arnold et al. ......................... 455/12 |
| 4,931,802 | 6/1990 | Assal et al. ............................ 455/12 |

Primary Examiner—Curtis Kuntz
Attorney, Agent, or Firm—William H. Meise

[57] ABSTRACT

A satellite communication system includes first, second and third electromagnetic radiators, the first and second of which are a contiguous pair, and the second and third of which are also contiguous. Two channels of information are each modulated onto carriers at the same frequency by means of mutually independent modulations. The modulations may be by orthogonal pseudorandom codes. The first channel is applied to the first and second radiators, and the second channel is applied to the second and third radiators. The first and second radiators form a beam which if decoded for the first modulation is independent to that formed by the second and third radiators. Consequently, the feed apertures overlap in a manner which provides a more constant field intensity in each beam, and which saves size and weight by comparison with a single radiator of corresponding aperture for each channel. In order to avoid the need for linear amplifiers and to reduce power consumption needs attributable to the overlapping apertures, the carriers are phased in mutual quadrature.

12 Claims, 3 Drawing Sheets

MULTI-FEED, MULTI-CHANNEL COMMUNICATION SYSTEM

BACKGROUND OF THE INVENTION

Attention has been directed to the problem of communicating between mobile stations on a continental land mass. It has been suggested that a satellite or satellites linked to ground stations could have coverage of the entire land mass for communication with mobile stations such as trucks and the like. To be useful, the satellite must be capable of communicating individually with a large number of different mobile stations scattered over a large land mass such as the continental United States. Mobile stations such as trucks cannot economically be fitted with a highly directive antenna for communicating with the satellite or with equipment for tracking the satellite with such an antenna nor can they carry sophisticated receivers or high-power transmitters. Instead, they carry relatively low gain dipole or monopole antennas, and consequently require a relatively high field strength for good reception, and can transmit only limited amounts of power toward the satellite.

Satellite transmitters are limited by the amount of power available from sources such as solar panels, and tend to be of relatively low power. At the present state of the art of commercial travelling-wave tube (TWT) amplifiers suitable for use in a satellite, they can produce about 100 watts of peak power at S band (about 2500 MHz). Consequently, very high gain is required at the satellite antenna in order to provide usable bit error rate (about $10^{-6}$ with a 10dB margin) at the mobile station.

The satellite is constrained as to the maximum weight which can be boosted into orbit. In addition, there is a tradeoff between the amount of fuel which can be carried by the satellite for station-keeping and the weight of large elements such as the antenna. A heavier antenna may limit the station-keeping fuel and thereby limit the useful life of the satellite. Consequently, it is very desirable to minimize the weight of the antenna. This, however, tends to limit its size, which conflicts with the requirement for high antenna gain. There may also be other size limitations on the satellite antenna, due to the size of the launch vehicle. For example, the ARIANE launch vehicle has a diameter of about 3.5 meters. Thus, a 3.5 meter diameter reflector can fit within the envelope, but any larger reflector would have to be furlable. Furlable reflectors are undesirable for cost and reliability purposes.

Figure 4:
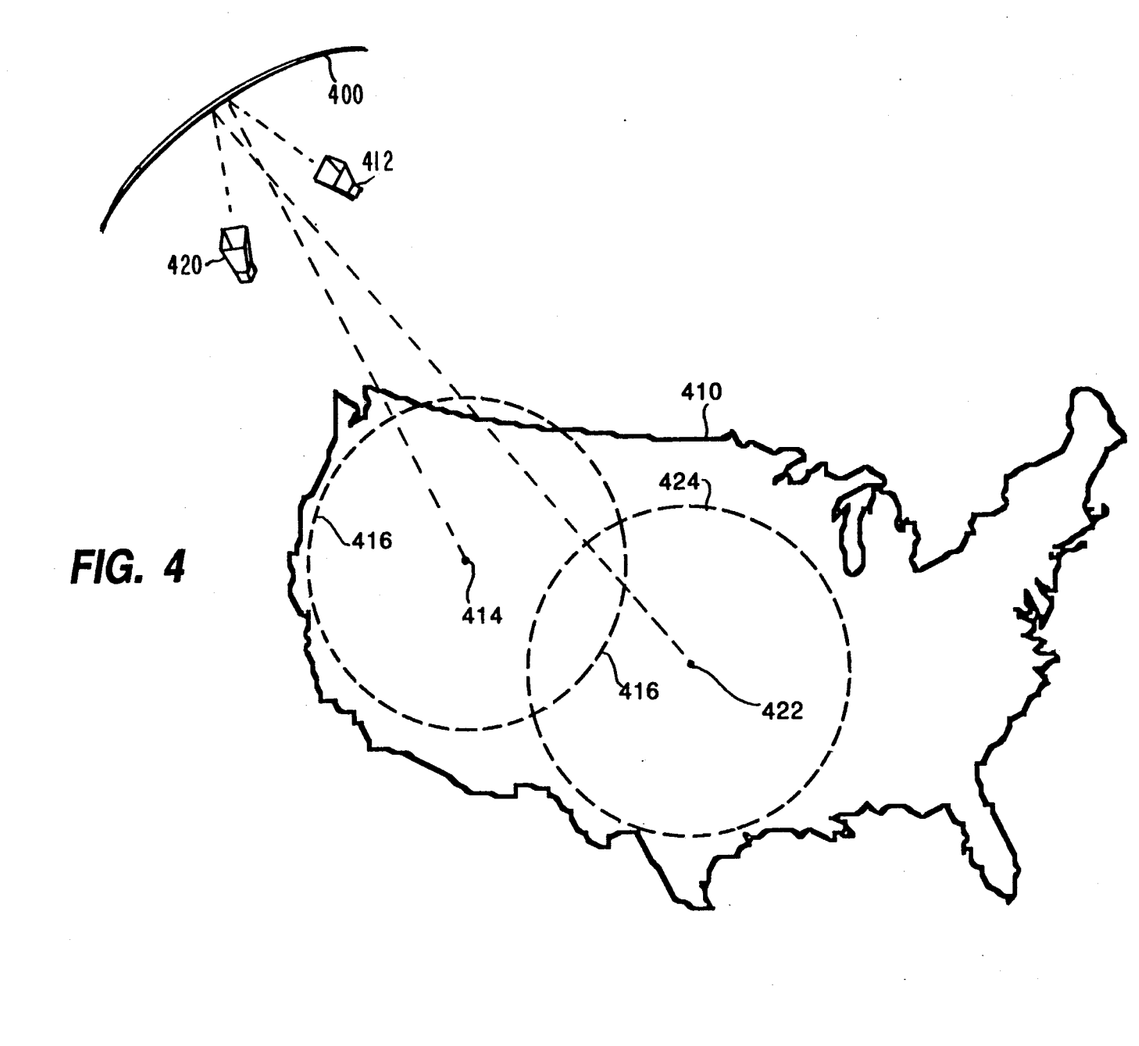
FIGURE 4 illustrates an antenna including a reflector and single feed horns, each forming a beam pattern directed towards a separate portion of the United States.

The relatively small size of a 3.5 meter reflector limits the gain of the satellite antenna. For radiated antenna beams directed to separate portions of the continental United States, with each beam being produced by one feed horn located in the focal region of the reflector, the mobile station might have satisfactory reception if it happened to be located at the beam center, but the beam shape would be such that at the transition between beams directed toward adjacent portions of the land mass, the signal level might well be to low for satisfactory reception. Beams produced by one feed horn for each separate beam directed to a region of a land mass tend to overlap at about a −4 or −5 dB level, as illustrated in FIG. 4. In FIG. 4, a reflector 400 is illustrated as being above the continental United States, illustrated by outline 410. A first single feed horn 412 located in the focal region of reflector 400 is illustrated as feeding reflector 400 to produce a beam centered on a point 414 having a 4½ dB contour illustrated as a dotted line 416. Another single feed horn illustrated as 420 also located in the focal region generates a beam displaced from the beam produced by horn 412. The second beam has a center at point 422 on the land mass and a 4½ dB contour illustrated as 424. While feed horns 412 and 420 are illustrated as separated, they are actually closely spaced or contiguous, and cannot be brought close enough to cause beam overlap at, say, the 1 dB contour. Thus, a vehicle moving from point 414 to point 422 would experience a 4 to 5 dB loss of received signal power at the beam transition, which might have a very adverse effect on the bit error rate. While only two beams are illustrated in FIG. 4, the satellite may produce four or five or more as required for the desired coverage.

With the expected antenna gains of the satellite antenna, and for a dipole or monopole antenna at the mobile station, 50 watts peak power at the satellite could provide a single user with a bit error rate of about $10^{-6}$ with a 10db margin at the beam peak (points 414 or 422 of FIGURE 4). Concurrent use of the channel by other users would not be possible because of frequency overlap and power limitations. If frequency division multiplex were used, truck drivers and other nontechnical personnel might be required to select the proper frequency for use, depending upon where they happened to be on the land mass, which might result in confusion. Time-division multiplex could be used, but transmission delays could be expected and extensive synchronizing techniques would be required.

SUMMARY OF THE INVENTION

A multi-feed, multi-channel communication system includes a first antenna for transducing electromagnetic signals between a first port and space, a second antenna for transducing electromagnetic signals between a second port and space, and a third antenna for transducing electromagnetic signals between a third port and space, the third antenna being physically located between and contiguous with the first and second antennas. A coupling arrangement is included for coupling the first, second and third ports with first and second channels, respectively. The coupling arrangement couples half the power from the first channel to the first antenna and the other half to the second antenna, and also couples half the power from the second channel to the second antenna and the other half to the third antenna. The first and second channels carry independent information modulated onto first and second carriers, with the carriers being at the same frequency. The modulation is selected so the first and second information can be demodulated in a mutually independent manner. A suitable type of modulation is code division multiplex, with the two channels using mutually orthogonal codes. In a particular embodiment of the invention, the coupling arrangement couples the first and third ports to the first and second channels in mutual phase quadrature.

DESCRIPTION OF THE INVENTION

Figure 1:
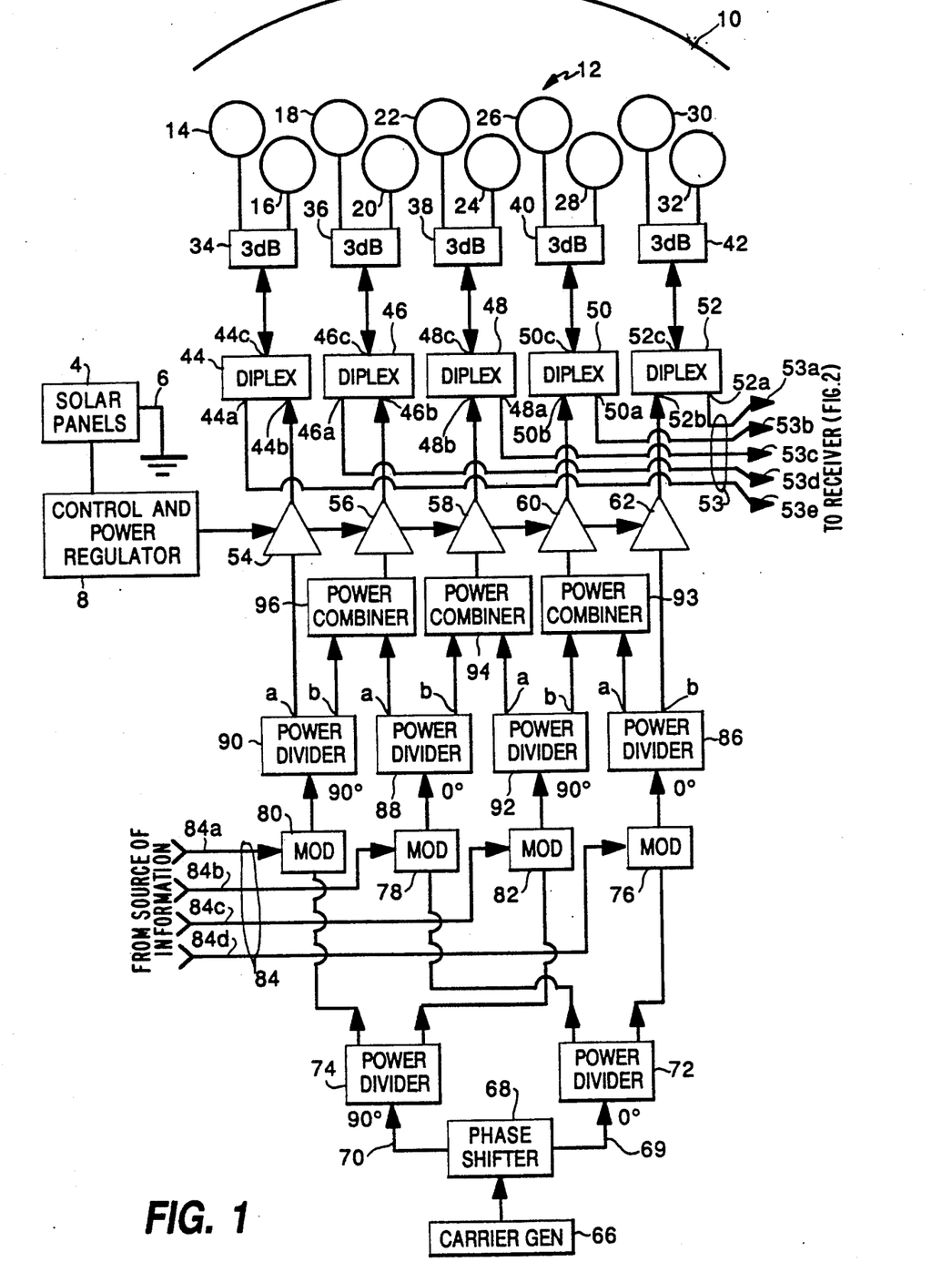
FIG. 1 is a simplified block diagram of a satellite with a portion of a communications system including a reflector, multiple feed, phase modulators, amplifiers and other portions of the multi-channel communications system.

In FIG. 1, a solar panel 4 is mounted on a spacecraft body suggested by a conventional ground symbol 6. Solar panel 4 is connected to a solar panel control unit and direct voltage regulator illustrated together as a block 8.

In FIG. 1, a reflector 10 mounted on spacecraft body 6 has a focal region designated generally as 12. An array of electromagnetic antennas 14, 16, 18, 20, 22, 24, 26, 28, 30, 32, each of which may be a horn, is located at the focal region. Horns 14 and 16 are connected to a 3db hybrid or power combiner/splitter 34 for receiving signal therefrom for transmission, or for coupling signal thereto upon reception. Similarly, a pair of feed horns 18, 20 is coupled to a power combiner/splitter 36, horn pair 22, 24 is connected to a combiner/splitter 38, horn pair 26, 28 is connected to a combiner/splitter 40, and horn pair 30, 32 is connected to a combiner/splitter 42. Horns 14 and 16 are contiguous with (adjacent to and touching, or adjacent to and not touching) horns 18 and 20, respectively. Similarly, the illustrated horn pairs are contiguous with those pairs illustrated as adjacent.

Those skilled in the art know that antennas, power divider/combiners, diplexers and the like are linear reciprocal devices capable of translating signals in two mutually opposite directions. For example, an antenna may transmit or receive, and has the same directivity in both modes of operation. Thus, an antenna may be considered to be a transducer of electromagnetic signals between an antenna port and free space. Even though it is reciprocal, antennas are usually described in terms apt for only one of the transmission or reception functions. Transmission terminology is used unless otherwise indicated. The properties of combiner/splitters such as 34–42 (the hyphen represents the word "to") and of other linear elements are well known.

When a combiner/splitter 34–42 receives signals from its associated horn pair, it combines the received signals in-phase and couples the combined signal to a diplexer of a set of diplexers 44–52. It should be noted that at frequencies where physical structures are commensurate with the wavelength, the use of transmission lines rather than simple conductors is appropriate. The use of transmission lines and the requirements for controlling and matching their electrical lengths to avoid phase problems is well known in the art, and such knowledge is assumed herein. Each diplexer 44, 46, 48, 50 and 52 has a combined port designated 44c, 46c, 48c, 50c and 52c, respectively, which is coupled to one of combiner/splitters 34–42, and also includes a port 44b, 46b, 48b, 50b and 52b, respectively, adapted for coupling to a transmitter and yet another port 44a, 46a, 48a, 50a and 52a, respectively, adapted for being coupled to a receiver. Separation of the signals to be transmitted from those being received is accomplished in the diplexers by frequency division, the transmitter frequency being different from the reception frequency. A typical transmitter frequency in the S band might be 2500 megahertz and the receiver frequency might be in L band at 1600 megahertz. Such diplexers are well known in the art and require no further explanation.

Each of diplexers 44, 46, 48, 50 and 52 couples the signal received from the feed horns to a conductor or transmission line 53e, 53d, 53c, 53b and 53a, respectively, which are part of a bundle of transmission lines 53. These transmission lines carry the received signals to low noise amplifiers (LNA) of a receiver portion, as described below.

Each diplexer 44, 46, 48, 50 and 52 receives at its corresponding transmitter input port 44b, 46b, 48b, 50b and 52b, respectively, the signal from one of a plurality of high power amplifiers 54, 56, 58, 60 and 62, respectively, which may be, for example, travelling-wave tube amplifiers. Amplifiers 54–62 receive direct voltage from control and power regulator 8 for energization. Travelling-wave tube amplifiers and solid-state-power amplifiers are much more efficient in converting direct-current power to radio-frequency (RF) power when operated in a limiting or saturated mode, by comparison with a linear mode in which signal amplitude variations occur.

At the bottom of FIG. 1, a carrier generator 66 produces an unmodulated carrier signal which may be, for example, at S band, and couples the signal to a differential phase shifter illustrated as a block 68, which produces a reference phase shift illustrated as 0° on a conductor 69 and a signal on a conductor 70 which is in phase quadrature (90°) with the reference phase. The signal at reference phase is coupled from phase shifter 68 to a power divider 72 which could be a 3db hybrid as known in the art, and the quadrature signal on conductor 70 is coupled to a similar power divider 74. Power divider 72 divides the signal into two equal, in-phase portions which are applied to phase modulators 76 and 78, and power divider 74 similarly divides the quadrature-phase (90°) signal into two portions which are applied to phase modulators 80 and 82.

Figure 3:
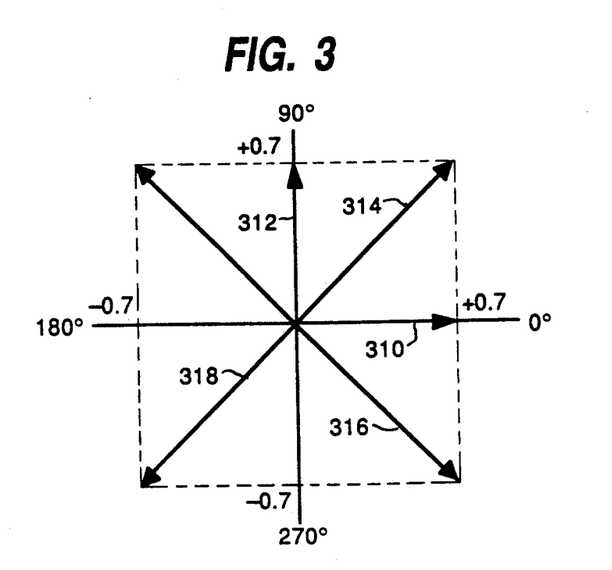
FIG. 3 is a phase diagram illustrating the constant amplitude of the modulated signal which allows the amplifiers to operate in a limiting mode, thereby allowing the feed horns to be "overlapped" without increasing the peak voltage capability of the amplifiers and maximizing the direct current (dc)-to-radio frequency (RF) conversion efficiency.

Modulators 80, 78, 82 and 76 each receive independent binary information signals over signal input conductors 84a, 84b, 84c, and 84d, respectively, which are part of a conductor bundle 84. Modulators 76, 78, 80 and 82 are phase modulators which modulate their respective signals with relative 0° and 180° phase shifts depending upon the state of the binary information signal input. Referring to FIG. 3, the signal applied to phase modulators 76 and 78 of FIG. 1 is illustrated as lying along an axis 310, while the signal applied to phase modulators 80 and 82 of FIG. 1 is illustrated as lying along an axis 312 orthogonal to axis 310. The application of a logic low or binary zero to the information input of a modulator corresponds to the unmodulated condition, which may be for example the 0° condition for modulators 76 and 78 and the 90° condition for modulators 80 and 82, while the logic high or binary one corresponds to the 180° and 270° conditions, respectively. The binary information signal on each of conductors 84a, 84b, 84c and 84d is a pseudorandom sequence modulated with information which may or may not be mutually independent. As to the other pseudorandom sequences or codes being modulated, the pseudorandom code on any of lines 84a–84d is orthogonal. Orthogonal pseudorandom sequences for communications purposes are well known.

Modulators 76 and 78 of FIG. 1 phase modulate the reference or 0° phase signal portion and apply the modulated signal to further power dividers 86 and 88, respectively, and modulators 80 and 82 modulate the relatively quadrature or 90° signals and apply them to further power dividers 90 and 92, respectively.

Power dividers 86, 88, 90 and 92 each divide the power applied to their input ports into two equal amplitude portions, which appear at output ports designated a and b. The portion of the modulated, 90° signal appearing at output port a of divider 90 is applied to the input of power amplifier 54. As mentioned, power amplifier 54 applies its signal to the input port 44b of diplexer 44, from which it is coupled to 3dB hybrid 34. The modulated 90° signal at output port b of power divider 90 is applied to an input port of a power combiner 96. The portion of the modulated 0° signal from output port a of power divider 88 is applied to a second input port of power combiner 96. Power combiner 96 combines the modulated 0° and 90° signal portions to produce a combined signal which is applied to the input port of power amplifier 56. As mentioned, amplifier 56 applies its amplified signal to input port 46b of diplexer 46 for coupling to 3dB hybrid 36.

Power divider 88 also produces a portion of the modulated 0° signal at its output port b, which is applied to an input port of a power combiner 94. A second input port of power combiner 94 receives a modulated 90° signal portion from output port a of power divider 92. Combiner 94 combines the signals to produce a combined signal which is applied by way of power amplifier 58 to input port 48b of diplexer 48 and thence to 3dB hybrid 38.

A portion of the modulated quadrature signal appears at output port b of power divider 92, which is coupled to a first input port of a poWer combiner 93 together With a portion of the modulated reference-phase signal applied to a second input port from output port a of power divider 86. Power combiner 93 combines the signals to produce a combined signal which is applied to 3dB hybrid 40 by way of power amplifier 60 and diplexer 50. The portion of the modulated reference-phase signal appearing at output port b of power divider 86 is coupled to 3dB hybrid 42 by way of power amplifier 62 and diplexer 52.

In operation, the quadrature-phase signal modulated with information from conductor 84a (called channel 1 for convenience) is divided into two equal portions, one of which is applied to feed horn pairs 14 and 16, and the other one of which is applied to feed horn pairs 18 and 20. The channel 1 signal is not applied to any other feed horns. Consequently, the channel 1 information is applied to four feed horns 14, 16, 18 and 20. These feed horns are closely spaced. Such a four-horn array has a feed amplitude distribution with four peaks rather than one peak as in a single-horn feed for channel 1. Consequently, the four-horn array produces a beam, which when reflected from reflector 10, generates a beam which provides a more even electromagnetic field distribution or the surface of the land mass than does a single horn feed.

A portion of the 0° phase signal modulated with information from conductor 84b (called channel 2 for convenience) is fed from modulator 78 to feed horn pair 22, 24. In accordance with an aspect of the invention, a second portion of the channel 2 information is applied to feed horn pair 18, 20, so that feed horn pair 18, 20 is used for both channel 1 information and channel 2 information. Channel 2 information is not applied to other feed horn pairs. In effect, feed horn pair 18, 20 is reused or common to both channels 1 and 2. Consequently, channel 1 has a four-horn feed consisting of horns 14, 16, 18 and 20, and channel 2 has a four-horn feed consisting of horns 18, 20, 22 and 24. If channels 1 and 2 each drove a single horn, each of which had the same aperture as the combined apertures of four of feed horns 14–32, not only would the beams projected onto the land mass have a relatively great change in intensity from the peak value at the center of the beam to the beam edge at the crossover point to the next adjacent beam, but the feed structure would be physically larger than the structure of the feed according to this aspect of the invention. In effect, the apertures of the channel 1 and 2 feed structures are overlapped, with feed horn pair 18, 20 being the overlap region. These two feeds for channels 1 and 2 are independent so long as the characteristics of the two channels allow their separation. Because of the code modulation by mutually orthogonal codes, the channel 1 signal is fed from horns 14, 16, 18 and 20 in a manner which ray be received totally independently of the channel 2 signal fed from horns 18, 20, 22 and 24. Thus, two independent beams are transmitted from an overlapping aperture.

In a similar manner, a "channel 3" signal, which is the quadrature signal from modulator 82, pseudorandom code modulated with information from conductor 84c which is orthogonal to the other codes, is applied to feed horn pair 22, 24 and to pair 26, 28. However, feed horns 22 and 24 also receive channel 2, so there is an overlap of the feed horn apertures as described above which further reduces the overall size of the structure for size and weight reduction, and in addition the use of four feed horns within the feed aperture provides a more even intensity or field distribution at the surface of the land mass. The fourth channel of information from conductor 84d is independently modulated onto the 0° carrier in modulator 76, and is applied to feed horn pairs 26, 28 and 30, 32, for size reduction and more even field distribution.

It should be noted that if there were four single feed horns, one for each channel, only four power amplifiers would be necessary. Assuming that (say) 100 watts of power were available from a single TWT amplifier, each feed horn could be fed with about 100 watts. A total of about 400 watts would be transmitted by the satellite. Each amplifier would be required to withstand a signal voltage of about 70 volts, assuming a 50 ohm system impedance. However, the arrangement of FIG. 1 has five amplifiers. In order to transmit 400 watts total without the quadrature phase shifts provided by phase shifter 68 and the particular combinations made, noting that the three center amplifiers each carry twice as much power as the two outer amplifiers, the two outer amplifiers must each carry 50 watts, which requires that they be able to withstand a signal voltage of about 50 volts. The three center amplifiers, however, would be required to carry two 50-watt channels, each with a 50 volt signal. The total voltage which would have to be handled or withstood would then be twice 50 volts, or 100 volts, which is a higher voltage than that which would occur if a single channel were carried. The need to be able to supply the additional instantaneous voltage would then mean that the amplifier would not only be substantially more expensive, but it would also mean that the amplifier would be operating in a linear rather than in a saturated mode and would therefore be less efficient in the conversion of dc to RF power. In the context of a satellite, such a lower efficiency is unacceptable, because the greater power drain would require larger and heavier solar panels, wiring and power rejection systems. Thus, the quadrature phase relationship allows the feed horns to be "overlapped" for weight reduction and radiation pattern broadening without sacrifices in relation to the cost of individual amplifiers or in dc-to-RF conversion efficiency.

FIG. 3 illustrates with vectors the four possible conditions of modulation of two combined channels. In FIG. 3, an unmodulated condition of the 0° carrier is a vector with amplitude of 0.707 lying along the 0° axis, and an unmodulated condition of the 90° carrier is represented by a similar vector directed in the +90° direction. The resulting vector sum 314 has an amplitude of 1.00 at 45° (1.00∠45°). An unmodulated 0° carrier and a modulated 90° carrier result in vector 316 having amplitude of 1.00 at 315° (1.00 ∠315°. Modulated 0° and 90° carriers result in a sum vector 318 which is 1.00 ∠225°, and unmodulated 90° carrier with modulated 0° carrier gives vector 320, 1.00 ∠135°. All four possible resulting vectors have unity amplitude, indicating that there is no variation in signal voltage which depends upon modulation.

Figure 2:
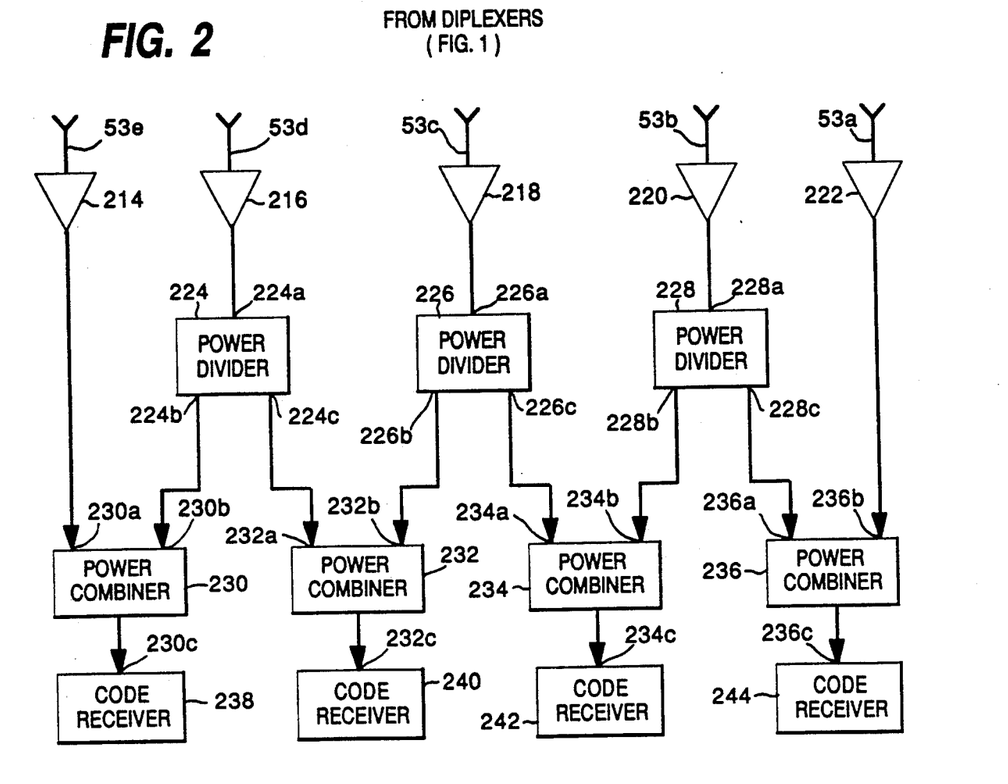
FIGURE 2 is a simplified block diagram of a portion of a receiver associated with the arrangement of FIG. 1.

In FIG. 2, conductor or transmission line 53e couples signal at L-band originating from diplexer 44 of FIG. 1 to a low-noise amplifier (LNA) 214, which amplifies the signal and applies the amplified signal to an input port 230a of a power combiner 230. Conductor 53d couples signal originating from diplexer 46 (FIG. 1) to an LNA 216, which applies amplified signal to the input port 224a of a power divider 224. Similarly, conductors 53a, 53b and 53c couple signals originating from diplexers 52, 50 and 48, respectively (FIG. 1) to LNA's 222, 220 and 218, respectively, which amplify the signals and apply the amplified signals respectively to the input port 236b of a power divider 236, the input port 228a of a power divider 228, and the input port 226a of a power divider 226.

Power divider 224 divides its input signals into two equal, mutually in-phase portions, which appear at output ports 224b and 224c. Similarly, power dividers 226 and 228 each divide their input signals into two portions which appear at output terminals 226b and c and at 228b and c, respectively.

Power combiner 230 combines the signal received from LNA 214 at input port 230a with the signal received at input port 230b from power divider 224, to produce at its output port 230c a combined signal representative of the beam generated by the feed antenna combination including horns 14, 16, 18 and 20 of FIG. 1 when the combined signal at port 230c is coupled to a pseudorandom code receiver or correlator 238 for decoding the pseudorandom code modulation of the mobile transmitters travelling over that portion of the land mass to which the particular beam is directed. The effect of reception of the other signals by the feed horns is irrelevant because code receiver 238 rejects the other pseudorandom codes.

Power combiner 232 combines the signal received at its input port 232a from port 224c of power divider 224 with the signal received at its input port 232b from output port 226b of power divider 226 to produce a combined signal at its output port 232c representing (when decoded) the signals received by feed horns 18, 20, 22 and 24 of FIGURE 1 from mobile transmitters passing over that portion of the land mass to which the particular beam is directed. Code receiver 240 decodes the appropriate one of the pseudorandom codes.

Similarly, power combiner 234 applies from its output port 234c to a code receiver 242 a signal which is the combination of the signals applied to its input ports 234a and 234b from output ports 226c of power divider 226 and 228b of power divider 228, respectively. Power combiner 236 applies from its output port 236c to a code receiver 244 a signal which is the combination of the signals applied to its input ports 236a and 236b from output port 228c of power divider 228 and from LNA 222, respectively. Code receiver 242 decodes the pseudorandom sequence associated with vehicles traversing the antenna beam produced by the combination of feed horns 22, 24, 26 and 28. Code receiver 244 decodes the pseudorandom sequence associated with vehicles traversing the antenna beam produced by feed horns 26, 28, 30 and 32.

Thus, what has been described is a satellite communication system which includes first, second and third electromagnetic radiators, the first and second of which are a contiguous pair, and the second and third of which are also contiguous. Two channels of information are each modulated onto carriers at the same frequency by means of mutually independent modulations. The modulations may be by orthogonal pseudorandom codes. The first channel is applied to the first and second radiators, and the second channel is applied to the second and third radiators. The first and second radiators form a beam which if decoded for the first modulation is independent to that formed by the second and third radiators. Consequently, the feed apertures overlap in a manner which provides a more constant field intensity in each beam, and which saves size and weight by comparison with a single radiator of corresponding aperture (or four independent radiators of corresponding aperture) for each channel. In order to avoid the need for linear amplifiers and to reduce power consumption needs attributable to the overlapping apertures, the carriers are phased in mutual quadrature.

Other embodiments of the invention will be apparent to those skilled in the art. For example, instead of using two different, orthogonal pseudorandom codes to allow the signal separations required to provide independent beams from overlapping feed apertures, two different types of modulations could be used, as for example amplitude modulation for one channel and frequency modulation for the other. Instead of using diplexers for frequency separation, frequency separating horn antennas could be used.

What is claimed is:

1. A multifeed, multichannel communications system, comprising:

first, second and third signal sources, each generating a signal at the same carrier frequency, and each being adapted to be modulated with independent information, said first and third sources being at the same reference phase of said carrier, and said second signal source being in phase quadrature with said reference phase;

first, second, third and fourth radiating means, said first and second radiating means being physically contiguous, said second and third radiating means being physically contiguous, and said third and fourth radiating means being physically contiguous; and coupling means coupled to said first, second and third signal sources and to said first, second, third and fourth radiating means, for dividing the signal power of each of said first, second and third signal sources into first and second equal portions, and for coupling said second portion of said signal power of said first signal source to said first radiating means, said first portion of said signal power of said second signal source together with said first portion of said signal power of said first signal source to said second radiating means, said first portion of said signal power of said third signal source together with said second portion of said signal power of said second signal source to said third radiating means, and said second portion of said signal power of said third signal source to said fourth radiating means.

2. A multifeed, multichannel communications system, comprising:

first, second and third signal sources, each generating a signal at the same carrier frequency, and each being adapted to be modulated with independent information, said first and third sources being at the same reference phase of said carrier, and said second signal source being in phase quadrature with said reference phase;

first, second, third and fourth radiating means, said first and second radiating means being physically contiguous, said second and third radiating means being physically contiguous, and said third and fourth radiating means being physically contiguous;

a first power divider including an input port which is coupled to said first signal source and also including first and second output ports;

a second power divider including an input port which is coupled to said second signal source and also including first and second output ports;

a third power divider including an input port which is coupled to said third signal source and also including first and second output ports;

a first power combiner including an output port which is coupled to said second radiating means and further including a first input port which is coupled to said first output port of said first power divider and a second input port which is coupled to said first output port of said second power divider; and a second power combiner including an output port coupled to said third radiating means and further including a first input port coupled to said first output port of said third power divider and a second input port coupled to said second output port of said second power divider.

3. A system according to claim 2 wherein said coupling means further comprises:

first amplifying means, said first amplifying means including an input port coupled to said output port of said first power combiner and also including an output port coupled to said second radiating means;

second amplifying means, said second amplifying means including an input port coupled to said output port of said third power combining means and an output port coupled to said third radiating means, said second amplifying means applying substantially the same power to said third radiating means as said first amplifying means applies to said second radiating means.

4. A system according to claim 2 wherein said coupling means further comprises:

a first transmission path for coupling said second output port of said first power divider to said first radiating means, said first transmission path, at said frequency, having a phase characteristic similar to that of the signal path extending from said first output port of said first power divider to said second radiating means y way of said first power combiner; and a second transmission path for coupling said second output port of said third power divider to said fourth radiating means, said second transmission path, at said frequency, having a phase characteristic similar to that of the path extending from said first output port of said third power divider to said third radiating means by way of said second combining means.

5. A system according to claim 4 wherein, at said frequency, the phase characteristic of the signal path extending from said first output port of said second power divider to said second radiating means by way of said second power combiner is similar to the phase characteristic of the signal path extending from said second output port of said second power divider by way of said second power combiner to said third radiating means.

6. A system according to claim 2 wherein said coupling means further comprises:

first amplifying means coupled to said second output port of said first power divider and to said first radiating means for amplifying said second portion of said first signal appearing at said second output port of said first power divider to produce amplified first signal for application to said first radiating means;

second amplifying means coupled to said output port of said first combining means and to said second radiating means for amplifying the combined first and second signal portions appearing at said output port of said first combining means for generating amplified combined first and second signal for application to said second radiating means, the amplitude of said first signal portion of said amplified combined first and second signal being equal to the amplitude of said amplified first signal;

third amplifying means coupled to said output port of said second combining means and to said third radiating means for amplifying the combined second and third signal portions appearing at said output port of said second combining means for generating amplified combined second and third signal for application to said third radiating means, the amplitude of the second signal portion of said amplified combined second and third signal being equal to the amplitude of said second signal portion of said amplified combined first and second signal.

7. A system according to claim 6 wherein each of said first, second and third radiating means comprises:

first and second electromagnetic antennas, each including an input port; and further power dividing means including an input port coupled to the output of one of said first, second and third amplifying means and also including first and second output ports, each coupled to a said input port of one of said first and second electromagnetic antennas.

8. A system according to claim 7 wherein each of said electromagnetic antennas comprises a horn.

9. A system according to claim 6 further comprising reflecting means including a focal region, said first, second, third and fourth radiating means being located near said focal region.

10. A system according to claim 2 further comprising first, second, third and fourth diplexing means coupled to said first, second, third and fourth radiating means, respectively, for coupling signals at said carrier frequency to said radiating means for transmission thereby, each of said diplexing means further including a port to which signals are coupled which are received by said radiating means at frequencies other than said carrier frequency.

11. A satellite, comprising:

a solar panel;

power regulating means coupled to said solar panel for producing regulated direct voltage;

first, second and third electromagnetic radiating means mounted on said satellite, said first and second radiating means being mutually contiguous and said second and third radiating means being mutually contiguous;

a source of first signals, said first signals comprising a carrier at a reference frequency and phase, modulated with first information;

a source of second signals, said second signals comprising a carrier at said frequency and at a phase in quadrature with said reference phase, modulated with second information in a manner which allows extraction of said second information independent of said first information;

coupling means coupled to said source of first signals and said source of second signals, said coupling means including first, second and third output ports for dividing each of said first and second signals into first and second equal portions, and for coupling said first portion of said first signal to said first output port, for coupling said second portion of said first signals and said first portion of said second signals to said second output port, and for coupling said second portion of said second signals to said third output port; and first, second and third amplifying means coupled to said power regulating means for being energized thereby, said first amplifying means being coupled to said first output port of said coupling means and to said first radiating means for amplifying said first portion of said first signals and for applying amplified signal to said first radiating means, said second amplifying means being coupled to said second output port of said coupling means and to said second radiating means for amplifying the combination of said second portion of said first signals and said first portion of said second signals and for applying amplified signal to said second radiating means, said third amplifying means being coupled to said third radiating means and to said third output port of said coupling means for amplifying said second portion of said second signals and for applying amplified signal to said third radiating means.

12. A satellite according to claim 11, wherein:

said source of first signals comprises a first pseudorandom code modulator for modulating said carrier associated with said first signals in response to a first pseudorandom code upon which said first information is impressed; and said source of second signals comprises a second pseudorandom code modulator for modulating said carrier associated with said second signals in response to a second pseudorandom code upon which said second information is impressed, said second pseudorandom code being orthogonal to said first pseudorandom code.

* * * * *

UNITED STATES PATENT AND TRADEMARK OFFICE
CERTIFICATE OF CORRECTION

PATENT NO. : 5,025,485

DATED : June 18, 1991

INVENTOR(S) : Rezso Janos Csongor et al.

It is certified that error appears in the above-identified patent and that said Letters Patent is hereby corrected as shown below:

Column 6, line 22, "ray" should be --may--.

Column 11, line 36, "ports" should be --ports,--.

Signed and Sealed this

Sixth Day of October, 1992

Attest:

DOUGLAS B. COMER

*Attesting Officer*  Acting Commissioner of Patents and Trademarks